3,380,185
FISHING LURE
Charles E. Jensen, deceased, late of Portland, Oreg, by
Audrey L. Johnson, administratrix, 5515 SW. Canyon
Court, Portland, Oreg. 97221
Filed Jan. 14, 1966, Ser. No. 520,810
6 Claims. (Cl. 43—42.11)

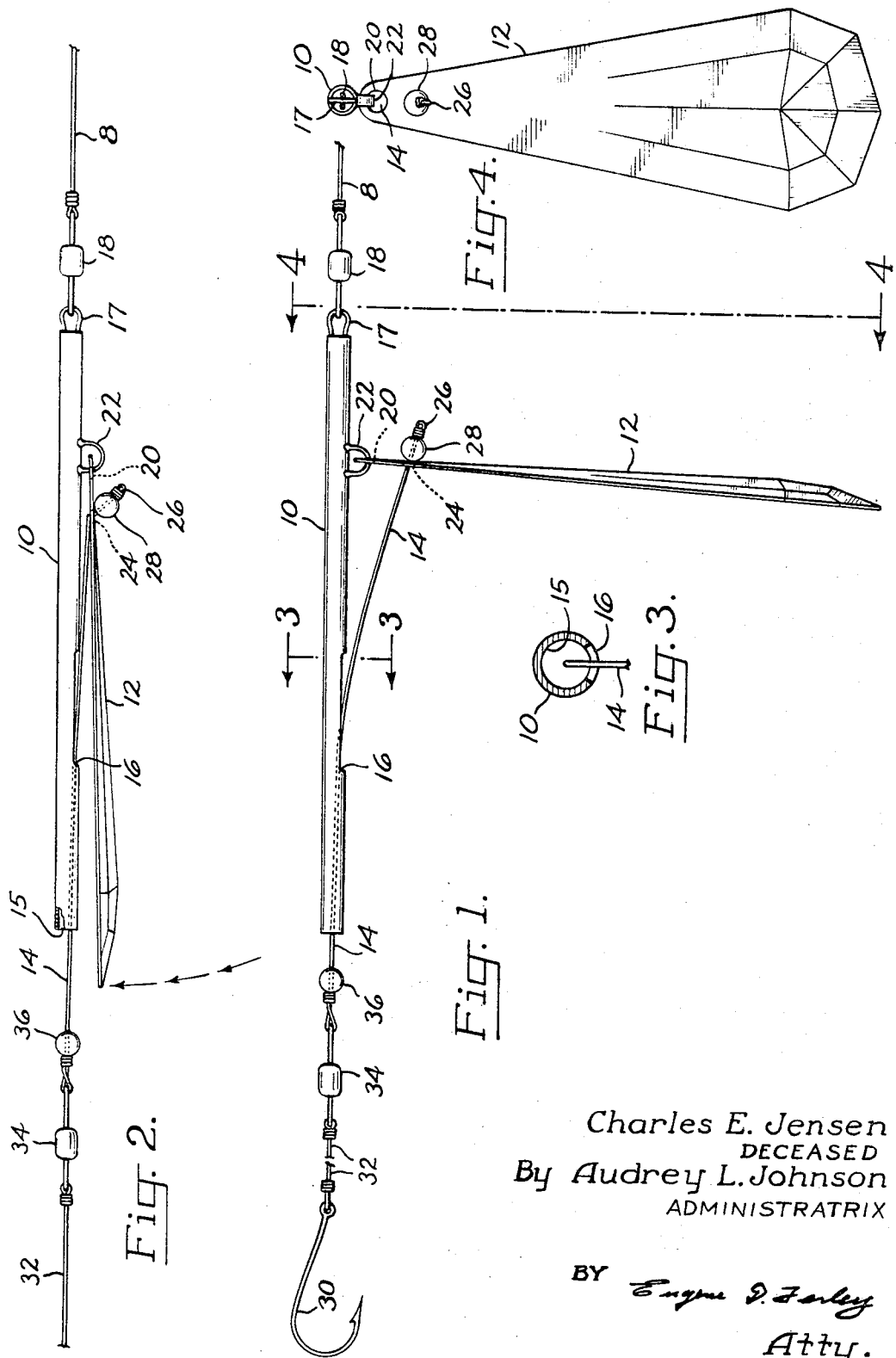

This invention relates to fishing lures.

In trolling for trout and other fish, a heavy single or multiple spoon frequently is attached to the fishing line above the leader and baited hook. When a fish is hooked, the spoon continues its rotation, interfering with the angler's effort and, because of its bulk and inertia often giving the fish sufficient purchase to tear free of the hook.

It is the general purpose of the present invention to provide a fishing lure which overcomes the foregoing problem.

Generally stated, the fishing lure of the invention comprises an elongated body adapted to be drawn lengthwise through the water. The leading end of the body is connected rotatably to the fish line and pivotally mounts a spoon.

A flexible connector is slidably disposed in a guideway at the rearward portion of the body. It extends outwardly from the guideway at both ends.

The leading end of the connector is fastened loosely to the spoon a spaced distance outwardly from its point of connection to the body of the lure. The trailing end of the connector is attached to the fish hook.

When the lure is drawn through the water, the weight of the bait on the hook is insufficient to affect the spinning motion of the spoon. However, when a fish is hooked, it exerts sufficient force to clamp the spoon against the body. In its collapsed inoperative position, the spoon is substantially aligned with the fish line and is prevented from interfering with the playing of the fish.

Considering the foregoing in greater detail and with particular reference to the drawings, wherein FIGS. 1 and 2 are side views of the herein described fishing lure, FIG. 1 illustrating the fishing position of the lure and FIG. 2 the collapsed, fish-playing position thereof; and FIGS. 3 and 4 are transverse sectional views taken along lines 3—3 and 4—4, respectively, of FIG. 1.

It is intended that the fishing lure of the invention be attached to a fish line 8 and drawn through the water while trolling or casting in the usual manner.

The lure includes an elongated body 10 which mounts both a spoon or spinner 12 and a flexible connector 14.

Body 10 advantageously may comprise a length of metal or plastic tubing open at its trailing end to provide a guideway 15 entered through a longitudinal slot 16.

Connecting means are provided for connecting the leading end of body 10 rotatably to fish line 8. In the illustrated form of the invention such means comprise a yoke 17 fixed to the guideway and a conventional swivel 18, one end of which is fastened to the yoke and the other end of which is secured to fish line 8.

Spoon or spinner 12 may be of the usual construction and may assume various dished configurations as desired. It serves the usual function of flashing a signal attractivet to fish as the lure is drawn through the water.

To secure the spoon pivotally to the leading end of body 10, it may be provided with an eye 20 which is received in a yoke 22 welded or otherwise fixed securely to the body of the lure.

Connector 14 preferably comprises a length of flexible stainless steel wire, nylon line, or other durable strong material. It is slidably mounted in guideway 15, being of sufficient length to extend forwardly through slot 16, and rearwardly through the open rear end of the guideway.

Means are provided for attaching the leading end of connector 14 to spoon 12 in such a manner that free rotation of the spoon is permitted during normal use of the lure.

For this purpose, the upper end of the spoon is provided with a perforation 24 a spaced distance downwardly from eye 20. The leading end of connector 14 is formed with a knot or loop 26. A glass or plastic bead 28 is interposed between perforation 24 and knot 26. It serves as a stop, preventing withdrawal of the connector through the perforation. It also serves as a bearing, permitting proper action of spoon 12 during use of the lure.

The trailing end of flexible connector 14 is connected to a fish hook 30 through a linkage which may include a leader 32 of suitable length and a swivel 34. One end of the swivel is tied to the leader and the other to the trailing end of connector 14.

A second glass or plastic bead 36 is mounted on the trailing end of connector 14 behind body 10 to facilitate the action of the lure.

The use position of the fishing lure of the invention is illustrated in FIG. 1. As the lure is drawn through the water, spoon 12 serves as a propeller which drives body 10 in a rotary motion so that the spoon flashes in its customary manner. The weight of hook 30 and of the bait impaled thereon is insufficient to impose a drag on the spoon through connector 14.

However, when a fish takes the bait, its weight and the force it exerts during its struggle will draw the slidably mounted connector lengthwise through guideway 15, thereby also drawing spoon 12 to the collapsed position of FIGURE 2. In this position the spoon lies alongside the guideway, relatively immobile so that it does not interfere with the playing of the fish. This has the two-fold effect of increasing the enjoyment of the angler and reducing the likelihood of his losing the fish.

It is to be understood that the form of the invention herein shown and described is to be taken as a preferred example of the same and that various changes in the shape, size and arrangement of parts may be resorted to without departing from the spirit of the invention or the scope of the subjoined claims.

Having thus described the invention, what is claimed is:

1. A fishing lure comprising
   (a) an elongated body adapted to be drawn lengthwise through the water and having a guideway on its trailing portion,
   (b) means connecting the leading end of the body rotatably to a fish line,
   (c) a spoon,
   (d) means pivotally connecting the spoon to the leading portion of the body,
   (e) a flexible connector slidably disposed in the guideway longitudinally thereof, and extending outwardly from said guideway at both ends,
   (f) means connecting the leading end of the connector to the spoon a spaced distance outwardly from its point of pivotal connection to the body,
   (g) and means connecting the trailing end of the connector to a fish hook.

2. The fish lure of claim 1 wherein the body and guideway comprise a tube open at its trailing end and having a centeral aperture, the tube being dimensioned to receive the connector with the leading end thereof projecting outwardly through the aperture.

3. The fish lure of claim 1 wherein the means for connecting the leading end of the body rotatably to the fish line comprises swivel means fastened at one end to the body and at the other end to the fish line.

4. The fish lure of claim 1 wherein the inner end of the spoon is provided with an opening and wherein the means for connecting the spoon to the body comprises a yoke threaded through the opening and fastened at both ends to the body.

5. The fish lure of claim 1 wherein the spoon is provided with an aperture a spaced distance outwardly from its inner end, the aperture being dimensioned to receive the flexible connector, and wherein the means for connecting the leading end of the connector to the spoon comprises stop means fastened to the end of the connector and dimensioned to prevent its withdrawal through the aperture.

6. The fish lure of claim 1 wherein the means for connecting the trailing end of the connector to a fish hook comprises swivel means, one end of which is connected to the fish hook and the other end of which is connected to the trailing end of the connector.

References Cited

UNITED STATES PATENTS

| | | | |
|---|---|---|---|
| 281,083 | 7/1883 | Kessler | 43—42.02 |
| 1,863,125 | 6/1932 | Powell | 43—42.04 |
| 2,756,532 | 7/1956 | Trester | 43—42.11 X |
| 2,785,496 | 3/1957 | Menkens | 43—42.19 |

SAMUEL MOREN, *Primary Examiner.*

W. H. CAMP, *Assistant Examiner.*